Sept. 30, 1924.
L. J. STARK
1,509,908
TRUCK ROW GUIDE ATTACHMENT FOR CORN LISTERS
Filed Aug. 16, 1922
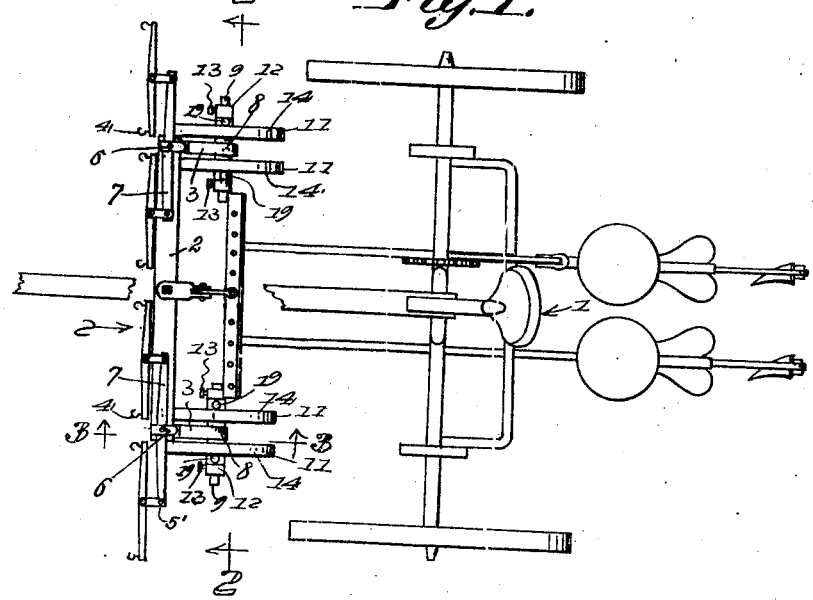
Inventor
Levi J. Stark,
By Watson E. Coleman
Attorney Patented Sept. 30, 1924.

1,509,908

UNITED STATES PATENT OFFICE.

LEVI J. STARK, OF NEW RAYMER, COLORADO.

TRUCK ROW GUIDE ATTACHMENT FOR CORN LISTERS.

Application filed August 16, 1922. Serial No. 582,196.

*To all whom it may concern:*

Be it known that I, LEVI J. STARK, a citizen of the United States, residing at New Raymer, in the county of Weld and State of Colorado, have invented certain new and useful Improvements in Truck Row Guide Attachments for Corn Listers, of which the following is a specification, reference being had to the accompanying drawings.

This invention relates to attachments for agricultural implements, and particularly to corn listers or like implements.

Where a four-horse team is hitched to a single row or double row corn lister, it has been found very difficult to guide the team in such a manner as to make the corn rows entirely straight, or if the corn rows are irregular to drive in such manner as to make the furrow being made an equal distance from the furrow which has been previously made.

The main object of my invention is to provide a row guiding attachment for corn listers which will act to guide the same so as to insure that the corn rows shall be parallel to each other and, therefore, to provide guiding wheels operatively connected to the evener bar of the lister hitch which will follow a furrow previously made and thus hold the lister so that the furrow being made by the lister will be parallel to or the same distance from the furrow previously made.

Heretofore corn listers have been built with a guiding attachment as an integral part of the corn lister, and therefore a further object of the invention is to provide an attachment which may be applied to the evener bar of any one row or two row corn lister which will act to guide the machine as described and which is adapted to be used with and placed on the evener bar of any ordinary lister of this character.

Another object is to provide a guiding attachment for listers which is very simple, which may be easily applied, and which may be readily removed whenever necessary.

My invention is illustrated in the accompanying drawings, wherein:—

Figure 1 is a plan view of a two row corn lister with my attachment applied thereto;

Figure 2 is a cross sectional view on the line 2—2 of Figure 1, showing the attachment in elevation;

Figure 3 is a sectional view on the line 3—3 of Figure 1;

Figure 4 is an enlarged sectional view through one of the guiding disks or wheels.

Referring to the drawings, 1 designates a two row corn lister as a whole, though it is to be understood that this invention is not limited in its application to a two row corn lister. Mounted upon the lister in the usual manner is the usual evener bar 2. My attachment comprises downwardly and rearwardly extending supports 3, which at their upper ends have a pair of parallel longitudinal extensions 4 spaced from each other to receive the evener bar 2 between them. These extensions or arms 4 are bolted to the evener bar 2 by two bolts 5', and the bolt 6 which pivotally connects the doubletree to the evener bar extends down through these arms or extensions 4. Thus it will be seen that the support 3 is rigidly connected to the end of the evener bar but that the doubletrees 7, as usual, are mounted for swinging movement on the end of the evener bar, these doubletrees carrying at their ends, of course, the usual singletrees.

There are two of these supports 3. Bearings are formed at the lower end of each support 3 and in each bearing there is mounted a transverse shaft 9 held in place by a set screw 10. Mounted upon the ends of the shaft 9 are the guide wheels or disks 11 which rotate freely upon the shafts. There are two of these wheels or disks 11 and, as illustrated in Figure 2, one pair of disks runs in the previously made furrow, while the other pair of disks rides on the land so that these disks or wheels act to guide the lister in moving over the field and cause the lister to move at all times parallel to the furrow which has been previously made.

In order to hold the guide disks in position upon the shafts, dust-proof collars or caps 12 are secured to the ends of the shafts 9 by set screws 13. The disks or wheels 11 of each pair of disks are dished with their convex faces confronting each other. Each disk or wheel is provided with a marginal flange 14 which rides upon the soil of the furrow.

While I do not wish to be limited to any specific construction for these guide wheels 11, preferably each wheel or disk is formed with a hub 15 comprising two opposed sections 16. These sections are flanged and clamp the center of the disk between them, there being rivets 17 passing through the flanges and through the disks for holding the hub sections in position. The hub sections may be welded to the disks or the hub may be made as an integral part of the disks. The confronting faces of the dust-proof caps or collars 12 are recessed, as at 18, for the reception of the ends of the hub sections and thereby act to exclude dirt and foreign matter from between the hub and collars and from between the hub and the shaft. These dust caps or collars act to hold the disks in place and are adjustable so that the disks may be moved nearer to or further from each other in accordance with the width of the furrow. The oil cups 19 are carried by the collars 12 for the purpose of lubricating the hubs of the disks or wheels.

It will be seen from Figure 2 that the guide wheels or disks 11 are so arranged that one pair of the wheels operates within a furrow, while the other pair rest upon the unplowed ground and, therefore, it will be obvious that the wheels which are in the furrow will guide the lister so that it will travel parallel to the previously made furrow and at a spaced distance therefrom, thus making all the corn rows an even distance apart.

It will be seen from the drawings that the fork formed by the parts 4 which embrace the evener bar is attached to the evener bar at the exact point where the doubletrees are bolted on and that the doubletrees are loose and operate in exactly the same manner as if no guide wheels had been attached to the evener bar. I have illustrated a two-row lister and have shown the point of attachment of the wheel support 3 to the evener bar on a two row lister, but it will be understood that this will have to be changed for a one row lister and that it is within the purview of my invention to shift the position of the members 3 along the evener bar to any desired point. It is to be clearly understood that my attachment is to be applicable to either a single row or a double row lister. It is to be also understood that the guide wheels and their supports are not a fixed part of the lister but that they are intended to be attached to any of the existing listers which do not have truck row guides.

The guide wheels or disks are to travel in the last furrow which is made by the lister, that is in the furrow next to the furrow being made. The disks or guide wheels are adjustable both toward and from each other. This is desirable in order that they may be made to track in either a wide or narrow furrow. It is necessary that the wheels or disks be adjustable toward and from each other, in order that they may fit in the furrow and can be attached to any kind or make of lister. On some listers the tongues are omitted, and in such instance the attachment is connected direct to the lister, in other words the evener is attached to the lister. The disks or guide wheels are attached to each end of the evener, and the double trees are attached on each end or near the ends of the evener. The guiding wheels or disks are not attached to the body of the lister as it will be seen, but to each end of the evener, and this being the case, the wheels or disks have a tendency to guide the back part of the lister, and thus produce an even width between the rows or furrows. On the wide tread listers now in use the guide wheels or disks are attached securely to the frame of the lister on the forward part thereof, but in the present instance the attachment comprising the guide wheels or disks are carried by the evener.

I claim:—

1. The combination with a corn lister having an evener bar, and draft trees pivoted to said evener bar, of a pair of row guiding wheels mounted upon the evener bar to one side of the middle of the draft line of the machine and adapted to travel in a furrow, said wheels being adjustable toward or from each other.

2. The combination with a corn lister having an evener bar and draft trees pivoted to said evener bar, of a pair of standards rigidly secured upon and depending from the evener bar, the pivot bolts of the draft trees being engaged through the points of connection of the standards with the evener, and a pair of guide wheels rotatably mounted upon each standard, one pair of wheels being designed to travel in a previously made furrow with the other pair of wheels traveling upon the unplowed ground.

3. In combination with a corn lister having an evener bar and draft trees pivoted to the bar, a pair of standards rigidly secured to the evener bar and depending therefrom in a slightly rearwardly inclined direction, a shaft rigidly secured through the lower end of each standard, and a pair of wheels rotatable and longitudinally adjustably mounted upon each shaft, one pair of wheels being adapted to travel along a previously made furrow and the other pair of wheels being adapted to roll upon the unplowed ground.

4. Guiding means for a corn lister having an evener bar and draft trees pivoted thereto, comprising a standard rigidly secured to the evener bar at the point of pivotal connection of a draft tree therewith, a horizontal shaft rigidly secured through the lower end of the standard, wheels rotatably mounted upon the shaft and adjustable longitudinally thereon whereby to be moved toward or from each other to correspond to the width of a furrow in which the wheels are designed to travel, and stop collars engaged upon the shaft at each side of each wheel for maintaining said adjustment.

In testimony whereof I hereunto affix my signature.

LEVI J. STARK.